United States Patent [19]
Baize

[11] 3,975,266
[45] Aug. 17, 1976

[54] DEWATERING PROCESS

[76] Inventor: Sylvia S. Baize, 1433 Shankin, Walled Lake, Mich. 48088

[22] Filed: Nov. 6, 1974

[21] Appl. No.: 521,344

[52] U.S. Cl. .................................. 210/10; 210/52; 210/66; 37/195
[51] Int. Cl.² ........................................ B01D 21/01
[58] Field of Search .................. 210/54, 52, 10, 53, 210/51, 42, 18, 5, 6, 62, 66, 67; 37/195

[56] References Cited
UNITED STATES PATENTS

| | | | |
|---|---|---|---|
| 2,043,458 | 6/1936 | Windecker et al. | 210/5 |
| 3,300,407 | 1/1967 | Priesing et al. | 210/10 |
| 3,544,456 | 12/1970 | Shanfelt et al. | 210/54 |
| 3,642,619 | 2/1972 | Losasso et al. | 210/10 |

*Primary Examiner*—Thomas G. Wyse
*Assistant Examiner*—Benoit Castel
*Attorney, Agent, or Firm*—Basile and Weintraub

[57] ABSTRACT

A dewatering process for the separation and recovery of sludge from water reservoirs, such as, lakes, ponds, lagoons, rivers and the like is provided. The process includes the steps of dredging the reservoir, thickening the suspended matter in the water, dewatering the thickened matter and, then, recovering the sludge therefrom. The process further contemplates the addition of a flocculant to the dredged material between the dredging and thickening steps and/or between the thickening and dewatering steps.

4 Claims, No Drawings

DEWATERING PROCESS

BACKGROUND OF THE INVENTION

1. Field of the Invention

The present invention relates to water clarification processes. More particularly, the present invention relates to dewatering processes for the recovery of sludge from large masses of water. Even more particularly, the present invention relates to a dredging process for clarifying masses of sludge-containing water using chemical flocculants.

2. Prior Art

There has been developed over the years many proposed systems and apparatus for cleaning or clarifying large masses of water, both industrial and recreational. Because of ecological considerations research and development for feasible and economical solutions for cleaning up water has been greatly accelerated. This is especially true with respect to industrial waste waters which introduce many pollutants into the waterways.

Generally speaking, present day technology, with respect to the art under consideration herein, contemplates the useage of flocculants and the like in the treatment of the water masses. Furthermore, modern day technology differentiates between the types of water to be treated. Furthermore, specific modes of treatment have been developed for both specific chemicals present in the waste water and the water, per se. For example, U.S. Pat. No. 3,763,039 teaches a method for treatment of sewage. U.S. Pat. No. 3,423,309 teaches a method and apparatus for the removal of phosphate from organic waste.

Other prior art considers the biological oxygen demand of the organic matter within the waste water. See, inter alia, U.S. Pat. No. 3,623,976. Further art of interest hereto includes U.S. Pat. Nos. 3,677,405; 3,622,508 and 3,577,341. Of special interest hereto in U.S. Pat. No. 3,544,456 which is specifically directed to a dredging process and with which the present invention is most closely associated. Unlike the present invention, however, this reference specifically contemplates the continuous pumping of water onto a barge where it is, then, subjected to a polymeric treatment for separating the slit or sludge from the water using only a settling step.

SUMMARY OF THE INVENTION

In accordance with the present invention masses of water are clarified by a process which comprises: (a) dredging the water, (b) thickening the suspended matter in the water, (c) dewatering the thickened matter and (d) recovering the thickened matter from the dewatering step. The present invention further contemplates the addition of a flocculant intermediate the dredging and thickening steps and/or intermediate the thickening and dewatering steps.

The present invention is adapted for treatment of primary and secondary sludge, it is, also, perfectly amenable to treatment of activated sludge by providing an intermediate stage between the dewatering step and thickened matter recovery step.

The present invention further provides a two-stage process for introduction of the flocculant into the process stream. The two-stage process prevents degradation of the flocculant, especially where anionic or cationic polymeric flocculants are employed.

The flocculants useful herein are generally those flocculants which are conventionally deployed in the art and include anionic and cationic polymers, minerals and metallic salts.

For a more complete understanding of the present invention reference is made to the following detailed description and illustrative example thereof.

DESCRIPTION OF THE PREFERRED EMBODIMENT

In accordance with the present invention there is provided a process for the separation and recovery of sludge and other suspended matter from large masses of water. The process hereof generally comprises the steps of: (a) dredging the water, (b) thickening the suspended matter in the water, (c) dewatering the thickened matter and (d) recovering the thickened matter from the dewatering stage or step. The present invention further contemplates the use of a flocculant which is introduced intermediate the dredging and thickening steps and/or the thickening and dewatering steps.

More specifically, now, the initial step in the process hereof comprises the dredging of a mass of water. Dredging of the body of water can be achieved through any suitable mode well known to the skilled artisan. The dredging operation can be carried out on any suitable body of water amenable thereto, including reservoirs, lakes, rivers, ponds, lagoons and the like and may include industrial waste water reservoirs and the like including the clarification of waste water from pulp paper factories and the like.

As the dredging operation is carried out the mixture of water and sludge is delivered to a water clarifier or thickener whereat the initial separation occurs. The clarification or thickening can be conducted by either a sedimentation treatment or an "up-flow" treatment. Generally, in the sedimentation treatment the solid matter in the water settles to the bottom of a large reservoir and is removed therefrom. Other sedimentation treatments comprise the forced separation of solids from the water through perforated discs, belts, plates, screens, filter presses and the like. These are commercially known processes and equipment, such as a Lamella thickener.

In an "up-flow" clarification the solids in the dredged water are caused to be brought to the top of a flotation tank and are skimmed off therefrom. Usually, air is bubbled through the bottom of the tank and entrains the solid matter in the water and carries it to the top of the tank. Up-flow clarification tanks are commercially available products and are known to the skilled artisan. The skimmed off sludge is then dried out and recovered.

In accordance with the present invention the thickened matter is then subjected to a "dewatering" step to further concentrate the sludge and to, thus, separate water from sludge. Dewatering can be achieved by a plurality of modes, all of which further separate the solids from the aqueous medium. Dewatering cyclone is normally carried out by centrifuging, air flotation, vacuum filter treatment, filter press cyclonic separation or any other suitable means. Centrifuging is the preferred mode of dewatering the sludge.

After the thickened matter is dewatered the sludge which separates out is then recovered by any suitable mode dependent on the means for dewatering.

The rectified water from the dewatering stage is returned to lagoon, lake, pond or the like, or disposed of any other suitable mode. Additional flocculants may be added thereto to precipitate out any "fines," i.e., minute masses of unsettled sludge.

It should be noted that in practicing the present invention, the process hereof is carried out at ambient conditions.

Furthermore, and in accordance with the present invention there is contemplated a water treatment to facilitate sludge agglomeration. Accordingly, a flocculant addition step to the dredged water is contemplated by the present invention. Flocculant addition is carried out at/or intermediate the dredging and thickening stages and/or the thickening and dewatering stages.

The flocculant is used in an amount ranging from about 0.5 parts per million (ppm), by weight, to about 200 ppm, by weight, based on one million parts by weight of water and suspended matter. Normally, the solids content of the dredged water is about one-half to two percent by weight. The amount of flocculant employed will vary as a function of the flocculant, per se, and the amount and type of solids content of the water. Thus, polymeric flocculants will be employed in amounts ranging from about 0.5 to about 50 ppm, whereas organic salts will be utilized in amounts on the high side of the useful range.

The flocculants which can be used herein are those which are conventionally utilized in the art and include organic salts, ferric and ferrous salts, calcium compounds, minerals and synthetic polymeric compositions, such as, anionic and cationic polymers, as well as mixtures thereof. Examples of suitable non-polymeric flocculants include ferric sulfate, ferrous sulfate, calcium hydroxide, diatomaceous earth, bentonite, alum and the like, as well as mixtures thereof.

The useful polymers herein, as noted, are either cationic or anionic and must be water soluable. Suitable polymeric compounds are disclosed in U.S. Pat. No. 3,544,456, the disclosure of which is hereby incorporated by reference. Representative of such anionic compounds include polyacrylamide, copolymers of polyacrylamide and acrylic acid, acrylonitrite, N-substituted acrylamides, etc., sulfonated polystyrene, sulfonated polyethyleneimine, and the like. Suitable cationic polymers include polyethyleneimine, the condensation products of polyamines with polyakylene polyamines and so forth. Again, the useful polymers herein are disclosed in the referenced patent.

It should be noted that in the practice of the present invention mixtures of polymeric flocculants as well as polymeric and non-polymeric, also, can be used herein. The preferred flocculants, however, are the anionic polymers.

According to the present invention the polymeric flocculants are introduced into the flow stream by a two-stage process which inhibits polymer degradation. The first stage hereof comprises the preparation of a polymeric solution. This is achieved by mixing together, with stirring, the polymer and water to provide from about a one-fourth to one percent, by weight, aqueous solution of polymer. Optionally, air can be utilized in the polymeric solution preparation by bubbling it into the aqueous medium as the polymer is introduced thereinto. After the polymeric solution is prepared it is then transferred, by suitable pumping means, to a holding tank. From the holding tank, the solution is then metered into the flow stream of the dredged water at the intermediate points noted hereinbefore.

It should be noted, with respect to the holding tank, that the solution may be maintained under agitation to keep the polymer in solution. Moreover, the solution is held in the tank for no more than about thirty minutes to avoid breakdown of the solution, if agitated.

Although this two-stage process is particularly adapted for polymeric flocculants to inhibit the shear degradation thereof, non-polymeric flocculants can be metered into the flow stream in a like manner.

The present invention is completely amenable for the recovery of activated sludge and the treatment thereof. Thus, the present invention is amenable to an activated sludge treatment stage intermediate the dewatering and sludge recovery stages. Treatment of the activated sludge can be conducted by any suitable mode including halogenation treatment, i.e., chlorination, peroxide treatment, other preservation treatments, including permanganese treatment and the like.

It has been found that by the practice of the present invention that a sludge recovery of from 10 to 50%, by weight, of dry solids can be recovered from a dredge containing 2% solids at a polymer concentration of 10 ppm or less.

It should be, also, apparent from the foregoing that what has been described herein is a continuous process for the recovery of sludge and rectification of water by a continuous process.

For a more complete understanding of the present invention reference is made to the following illustrative, non-limitative example thereof.

EXAMPLE

This example illustrates the use of a two-stage polymeric flocculant addition in the process of the present invention.

Into a hopper equipped with means for introducing air thereinto is stored a polyacrylate polymer having a molecular weight of greater than about 300,000. The means for introducing air is also placed in communication with a 1,000 gallon mixing tank equipped with a three-fourth horsepower agitator connected to a solid state shaft. Into the mixing tank is charged, at 35 psig, one thousand gallons of water. While charging air thereinto and with stirring is added about 41 pounds of polymer to provide about a 1/2% solution of polymer. After the polymer is dissolved in the air and water it is pumped therefrom into a 1,000 gallon holding or polymer feed tank. The holding tank is equipped with agitation means to maintain the polymer in solution. The tank is connected to a main flow stream, through suitable piping equipped with a metering pump, containing dredged water and sludge prior to entering a Graver clarifier.

The dredge contains about 2% solids and flows at a rate of 2,000 gallons per minute and the polymer is admixed therewith at a rate of 14.5 gallons of polymer solution per minute.

After the dewatering stage about 144 pounds of sludge per 1,000 gallons of dredged water is recovered.

Having thus described the invention what is claimed is:

1. In a dredging process for the recovery of activated sludge from water, the improvement comprising:
   a. dredging a mass of water having solids suspended therein,
   b. admixing a flocculant with the dredge by:

1. dissolving the flocculant in water to form a solution thereof,
2. transferring the solution to a holding tank, and
3. metering the solution to the dredge from the holding tank, c. thickening the suspended matter in the water,
d. dewatering the thickened matter,
e. adding chlorine to the dewatered thickened matter,
f. recovering the thickened matter from the dewatering step, and wherein the flocculant is selected from the group consisting of ferric sulfate, ferrous sulfate, calcium hydroxide, diatomaceous earth, bentonite, alum, anionic polymers, cationic polymers and mixtures thereof, the flocculant being employed in an amount ranging from about 0.5 to 200 ppm, by weight, per million parts by weight of dredged water.

2. The process of claim 1 which further includes the step of:
admixing a flocculant with the thickened matter intermediate the thickening and dewatering steps.

3. The process of claim 1 wherein the flocculant is an anionic or cationic polymer.

4. The process of claim 3 wherein the flocculant is admixed with the dredge as a 0.25 to 1 percent, by weight, aqueous solution thereof.

* * * * *